Oct. 28, 1958    F. D. RIFNER    2,858,152
HUB ASSEMBLY AND FASTENING MEANS
Filed May 2, 1957
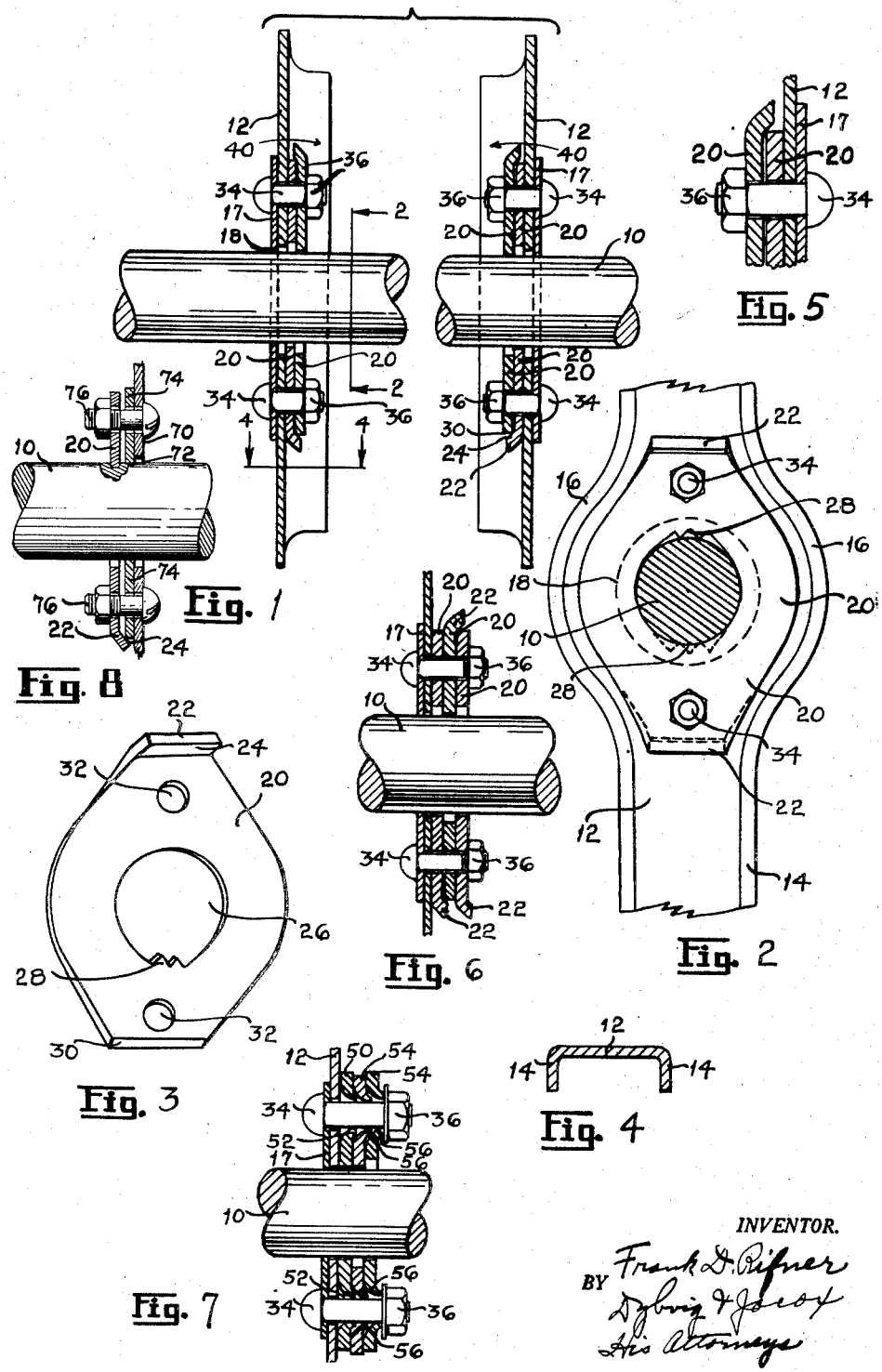
INVENTOR.
Frank D. Rifner
BY
His Attorneys

United States Patent Office 2,858,152
Patented Oct. 28, 1958

2,858,152

HUB ASSEMBLY AND FASTENING MEANS

Frank D. Rifner, Dayton, Ohio, assignor to Robert A. Mayne, Dayton, Ohio

Application May 2, 1957, Serial No. 656,721

5 Claims. (Cl. 287—52.07)

This invention relates to a hub assembly and fastening means for securing the hub in position upon the support and more particularly to a hub assembly adapted for use on blowers, electric fans, et cetera, wherein the fan is attached to a shaft by merely tightening a couple of screws, although not necessarily so limited, in that the hub assembly may be used in numerous other places where it is desirable to secure two members together in a locked position. This application is a continuation-in-part of my application Serial No. 249,897 filed October 5, 1951 for Hub Assembly and Fastening Means.

In the manufacture of blower wheels and fan blades, it is preferable to use as light material as consistently feasible for supporting the air propelling blades upon a drive shaft. One of the problems encountered in using light weight material, such as sheet metal, is the difficulty of mounting the assembly upon the shaft in a non-rotative position. A hub made from a casting that has been turned on a machine has been used, but the labor involved in manufacturing such a hub is quite expensive and that being the case, it is desirable to reduce the cost. Attempts have been made, some of which have probably been quite successful, to produce a built-up or fabricated sheet metal assembly for use as a hub; but, again, the expense of producing such hubs, especially when the production is not very great, becomes prohibitive, in that the cost of tooling is quite expensive.

An object of this invention is to provide means for attaching the support for an air propelling device that is self-locking upon the shaft without the use of a key and without the use of a set screw. This has been accomplished by using a plurality of members that are round, oval or some other shape, having a deflected portion along one edge thereof forming a cam surface, adapted to engage a cam-engaging surface of a similar member. Each of these members is provided with an aperture through which the shaft extends, the aperture being provided with a plurality of inwardly directed teeth or serrations diametrically disposed with respect to the cam surface. The cam surface is so arranged that when the screws or bolts are tightened in position, the cam surface of one member will engage the cam-engaging surface of another member, so as to cause the teeth to gouge into the shaft.

Another object of this invention is to provide a series of locking members so arranged that the locking members engage the shaft on opposite sides offset from each other, the members being grouped so as to counteract the torque created by the offset engagement of the shaft on opposite sides thereof.

Other objects and advantages reside in the construction of parts, the combination thereof, the method of manufacture and the mode of operation, as will become more apparent from the following description.

In the drawings, Figure 1 is a fragmentary cross sectional view of the locking assembly.

Figure 2 is a cross sectional view taken substantially on the line 2—2 of Figure 1.

Figure 3 is a perspective view of one of the members used in the locking assembly.

Figure 4 is a cross sectional view taken substantially on the line 4—4 of Figure 1.

Figure 5 is a detailed, enlarged, fragmentary view of a portion of the locking assembly.

Figure 6 is a longitudinal cross sectional view similar to a portion of Figure 1, disclosing a modified use of the locking assembly.

Figure 7 discloses another modification.

Figure 8 discloses another modification.

Referring to the drawings, the reference character 10 indicates a drive shaft for a blower wheel. A pair of spoke members 12 have been shown that form the support for the louvers or fan blades for a blower which has not been shown. The spoke members 12 may be made from sheet metal and provided with flanges 14 used in giving rigidity to the spokes, so as to permit the use of comparatively light weight sheet metal. In order to secure proper strength, the spoke members 12 are provided with an enlarged portion 16 in the vicinity of the shaft 10. The center portion 16 of the spoke member is provided with an aperture 18 that is somewhat larger than the diameter of the shaft 10. This permits the use of shafts having various diameters. The shaft may be larger than the one shown or it may be smaller. A centering member 17, having a diameter substantially equal to the diameter of the shaft 10, is positioned either on the outside or in the bottom of the channel. In Figure 1, the centering member 17 has been located on the outside of the spoke 12.

The spoke members are secured or locked upon the shaft by means of a plurality of substantially oval retaining members 20, each consisting of a plate member the main body of which extends in a plane perpendicular to the longitudinal axis of the shaft or axle 10. For a particular size of shaft, all of the retaining members 20 are identical.

As may best be seen by referring to Figure 3, member 20 is provided with a deflected portion 22 forming a cam surface 24 that is angularly disposed with respect to the plane of the main body of member 20. This deflected portion 22 and the cam surface 24 extend along one end of one side of member 20. In the approximate center of member 20 is an aperture 26, adapted to receive the shaft. Along one margin of the aperture 26 there is located inwardly directed teeth or serrations 28. These teeth 28 are diametrically disposed with respect to the cam surface 24. The diameter of the aperture 26, as measured from the apex of the teeth 28, is larger, but not much larger than the diameter of the shaft.

At the end of member 20 located opposite the cam surface 24 is a cam-engaging end or abutment 30. Member 20 is provided with a pair of apertures 32, the apertures 32 having a diameter somewhat larger than the diameter of the screws 34 used in clamping the assembly together. The apertures are sufficiently large to permit shifting of the members 20 to lock the spoke upon the shaft. The spoke member 12 is provided with apertures that are preferably the proper diameter for receiving the screws or bolts 34.

When two or more spoke members are used for a blower wheel, a pair of members 20 are used for securing each spoke member in position. As may be clearly seen from Figure 1, inner member 20 that is positioned in the bottom of the channel forming a spoke member 12, has the deflected portion 22 directed outwardly from the bottom of the channel. The second and outer member 20 has its deflected portion 22 located diametrically opposite the deflected portion of the inner member 20. By this arrangement, the cam surfaces 24 of each member 20 engage the cam-engaging surface or the abutment of the other member 20, so that the inner member 20 located in the bottom of the channel is urged downwardly, as viewed in Figure 1, by the outer member 20. Two forces set to urge the inner member 20 downwardly when the nuts 36 on the bolts 34 are tightened. The cam surface of the inner member 20 engages the abutment end of the outer member 20. This results in a force directed downwardly on the inner member 20 and upwardly on the outer member 20. The cam surface on the outer member 20 located on the top of Figure 1 engages the abutment end of the inner member 20, so as to urge the inner member downwardly and the outer member 20 upwardly. It can readily be seen that the two forces acting upon each of the members 20 cause the teeth 28 to gouge into or grip the surface of the shaft, so as to lock the spoke member in position. As may be seen in the enlarged view shown in Figure 5, the two members 20 do not come in contact with each other excepting at the cam surface and the cam-engaging or abutment surface. The centering member 17 maintains the spoke members 12 properly centered.

Due to the fact that the teeth 28 at one member 20 engage the shaft on one side and the teeth of the adjacent member 20 engage the shaft on the opposite side but in offset relation, a torque will be developed when two members 20 are used in retaining a spoke member in position, tending to rotate the spoke assembly in the direction of the arrow 40, as seen in Figure 1. When two spokes are used for supporting a blower wheel, the channels face each other. The retaining members are positioned so that if the deflected portion of the inner member of one spoke is directed downwardly, the deflected portion of the other inner member should also be deflected downwardly. By this arrangement, the torque or couple exerted upon one spoke is equal and counteracted by the torque or couple exerted upon the opposite spoke. If the blower wheel has sufficient rigidity and two spokes are used, the torque developed upon each spoke is, for all practical purposes, inconsequential.

For some types of blowers and for fan blades of the propeller type, the torque or couple caused by using only two retaining members 20 may be objectionable. In that event, three or more members 20 may be used, as shown in Figure 6. When three or more members are used, the deflected portion of each is directed in the same general direction, but are alternated, so that when one is up, the two adjacent ones are down. This holds true whether it is three or more that are being used.

In the modification disclosed in Figure 7, the cam surfaces used in forcing the teeth into the shaft are internally located. In this modification, a base plate 50 is located in the bottom of the channel of the spoke 12. This base plate 50 is provided with apertures substantially equal in diameter to the outer diameter of the bolts 34. Surrounding the apertures in the base plate 50 is a frustum-conical projection 52. In the center of the base plate 50 there is an aperture provided for the shaft 10 that is substantially equal in diameter to the diameter of the shaft. This aperture in the base plate 50 is used in aligning the spoke 12 with respect to the shaft 10. Camming plates 54 are used in locking the spoke to the shaft. These camming plates 54 are provided with apertures having internally disposed teeth identical to the arrangement shown in connection with the preferred embodiment, as best seen in Figure 3. Bosses 56 surround the apertures receiving the bolts 34. Frustum-conical cavities surround the bolts opposite the bosses 56. These bosses are so positioned as to bias or project the teeth 28 into the margin of the shaft 10, that is, the bosses 56 are off center with respect to the center of the shaft 10. The boss located on the same side of the camming plate as the teeth is further from the center of the shaft than the boss on the opposite side of the shaft. Again, these plates are arranged so that the teeth on alternate plates engage the same side of the shaft. When the bolts 34 are tightened, the bosses 56 on one plate are seated in the frustum-conical recesses in an adjacent plate to cause the camming plates to shift relative to each other, to thereby lock the spoke to the shaft.

In Figure 8, the drive shaft 10 has mounted thereon a disc member 70 used in supporting a member mounted for rotation with the shaft 10. The aperture 72 in member 70 is larger than the shaft. This member 70 may be used on various sizes of shafts. This member 70 is also provided with a pair of bolt holes. An annular centering member 74 may be selected from a plurality of centering members having varying sizes of holes for snugly receiving various sizes of shafts. The selected centering member has a hole snugly seated on the shaft 10. This centering member 74 has a pair of bolt holes registering with the bolt holes in member 70.

In this modification only one member 20 is used to lock member 70 to the shaft 10. The cam surface 24 of the deflected portion 22 engages the margin of member 74 so that as the bolts 76 are tightened the cam surface 24 engaging the margin of member 74 forces the teeth 28 to pierce the surface of the shaft 10 to non-rotatably hold members 70, 74 and 20 on the shaft 10. For many purposes one member 20 cooperating with member 74 produce a sufficiently tight lock for the assembly.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a mechanical locking device, the combination including a shaft, a member having an aperture larger than the shaft through which aperture the shaft projects, a pair of plate members for fixedly mounting the first mentioned member to the shaft, each of said plate members including an aperture larger than the diameter of the shaft projecting therethrough, the main body of each of said plate members being located in a plane perpendicular to the longitudinal axis of the shaft, teeth projecting inwardly from one margin of the apertures of the plate members for gouging the shaft, each of said plate members having a cam surface and a cam-engaging surface, one of said surfaces being radially disposed with respect to the teeth and the other diametrically disposed to said one surface, each of said cam surfaces consisting of a plate portion deflected along a line perpendicular to the diameter connecting the surfaces at an angle inclined with respect to the plane of its plate member, the cam surface of each plate member engaging the cam-engaging surface of the other plate member, each of the aforementioned members having holes for bolts, and bolts passing through said holes in the members so that upon the bolts being tightened they actuate the plate members toward each other thereby causing the cam surface of one to engage the cam-engaging surface of the other so as to force the teeth of each of the plate members into the shaft to lock the same in position.

2. In a mechanical locking device according to claim 1, wherein a centering member having an aperture substantially equal to the diameter of the shaft is fixedly attached to the first mentioned member for properly centering the same upon the shaft.

3. In a mechanical locking device, the combination including a shaft, a member having an aperture larger than the shaft through which aperture the shaft projects, a plurality of plate members for fixedly mounting the first mentioned member to the shaft, each of said plate members including an aperture larger than the diameter of the shaft projecting therethrough, the main body of each of said plate members being located in a plane perpendicular to the longitudinal axis of the shaft, teeth projecting inwardly from one margin of the apertures of the plate members for gouging the shaft, each of said plate members having a portion deflected out of the plane of the main body of its plate member forming a cam surface, the end of the plate opposite the deflected portion forming a cam-engaging surface, the deflected portion of the plate deflected along a line perpendicular to the diameter connecting said surfaces, the cam surface of one plate member engaging the cam-engaging surface of another plate member, one of said surfaces being radially disposed with respect to the teeth and the other diametrically disposed to said one surface, the deflected portions of all the plate members being directed in the same general direction, each of the aforementioned members having holes for bolts, and bolts passing through said holes in the members so that upon the bolts being tightened they actuate the plate members toward each other thereby causing the cam surface of one to engage the cam-engaging surface of another plate so as to force the teeth of each of the plate members into the shaft to lock the same in position.

4. The combination of an axle, a hub, means for locking said hub at various positions on said axle, said means comprising a plurality of plates in fixed engagement with said wheel hub; each of said plates being provided with a central aperture, each of said plates extending in a direction perpendicular to the longitudinal axis of the axle, a deflected portion of the plate forming a cam at one end of each plate and a cam-engaging surface at the other end thereof, said deflected portion being deflected along a line perpendicular to a radius extending from the center of said line to the center of the hub; the cam surface of each plate engaging a cam-engaging surface of the other plate, said deflected portion of the plate extending at an angle inclined with respect to the plate, said central aperture being provided with gouging means at one side thereof in a position diametrically opposite to said cam, tightening means for drawing said plates together, said cam-engaging surfaces contacting said cams so as to move the plates in opposite directions, said gouging means gouging into said axle thereby locking said hub on said axle.

5. In combination, a hub, an axle, means for locking said hub on said axle, said means comprising a plurality of axially spaced flat plates on said axle, each of said plates extending in a direction perpendicular to the longitudinal axis of the axle, each of said plates being provided with a cam surface and a diametrically oppositely disposed cam-engaging surface, said cam surface consisting of a plate portion deflected along a line perpendicular to the diameter connecting the surfaces, said deflected portion forming an angle acute to the plane of said plate, said cam-engaging surface on each of said plates engaging said deflected cam surfaces, said plates being provided with larger apertures than that required for receiving said axle, gouging means extending radially from the margin of the aperture of at least one of said plates and positioned diametrically opposed to the cam surface of said one plate, a centering member for centrally positioning said hub and plates on said axle; tightening means for fixing said plates to said hub and centering member, and for drawing said plates together; said cams contacting said cam-engaging surfaces to give opposite radial movement to said plates so that said gouging means will lock the plates on said axle.

References Cited in the file of this patent
UNITED STATES PATENTS

| | | |
|---|---|---|
| 361,323 | Rochow | Apr. 19, 1887 |
| 479,221 | Long | July 19, 1892 |
| 761,974 | Levedahl | June 7, 1904 |
| 830,641 | Brown | Sept. 11, 1906 |
| 1,226,896 | Lane | May 22, 1917 |
| 2,519,958 | Firth | Aug. 22, 1950 |

FOREIGN PATENTS

| | | |
|---|---|---|
| 6,102 | Great Britain | June 4, 1908 |